United States Patent
Christoff et al.

(10) Patent No.: US 8,621,007 B2
(45) Date of Patent: Dec. 31, 2013

(54) RULE-BASED ELECTRONIC MESSAGE PROCESSING

(75) Inventors: Max Benjamin Christoff, Berkley, CA (US); Denis Khodak, Jersey City, NJ (US); Eden Kidner, Hoboken, NJ (US); Julianne Clare Sharer, Stamford, CT (US); Sharada Balasubramanyam, North Brunswick, NJ (US); Stephen Michael Sparkes, New York, NY (US)

(73) Assignee: Morgan Stanley, New York, NY (US)

( * ) Notice: Subject to any disclaimer, the term of this patent is extended or adjusted under 35 U.S.C. 154(b) by 1239 days.

(21) Appl. No.: 11/528,496

(22) Filed: Sep. 27, 2006

(65) Prior Publication Data

US 2007/0106741 A1    May 10, 2007

Related U.S. Application Data

(60) Provisional application No. 60/721,224, filed on Sep. 27, 2005.

(51) Int. Cl.
*G06F 15/16* (2006.01)
*G06Q 10/10* (2012.01)
*H04L 12/58* (2006.01)

(52) U.S. Cl.
CPC ............ *G06Q 10/107* (2013.01); *H04L 12/585* (2013.01); *H04L 12/58* (2013.01)
USPC ........... 709/206; 709/201; 709/202; 709/203; 709/204; 709/205; 709/207

(58) Field of Classification Search
USPC .................................................. 709/201–207
See application file for complete search history.

(56) References Cited

U.S. PATENT DOCUMENTS

| | | | | |
|---|---|---|---|---|
| 6,546,416 | B1 * | 4/2003 | Kirsch | 709/206 |
| 6,775,691 | B1 * | 8/2004 | Kubik et al. | 709/206 |
| 7,149,780 | B2 * | 12/2006 | Quine et al. | 709/206 |
| 7,194,515 | B2 * | 3/2007 | Kirsch | 709/206 |
| 7,265,853 | B1 * | 9/2007 | Kara et al. | 358/1.15 |
| 7,366,761 | B2 * | 4/2008 | Murray et al. | 709/206 |

(Continued)

FOREIGN PATENT DOCUMENTS

| | | |
|---|---|---|
| EP | 1367522 A1 | 12/2003 |
| JP | 6-276221 A | 9/1994 |

(Continued)

OTHER PUBLICATIONS

International Search Report for PCT/US2006/037653, Jan. 31, 2007 (6 pages).

(Continued)

*Primary Examiner* — Saket K Daftuar
(74) *Attorney, Agent, or Firm* — K&L Gates LLP

(57) ABSTRACT

In various embodiments, a computer-assisted method for processing an electronic message includes the steps of reviewing the recipients of the electronic message, evaluating whether any of the recipients of the electronic message are potentially incorrect, and prompting the sender of the electronic message to evaluate whether the potentially incorrect recipients are correct. This computer-assisted method, as it evaluates whether a recipient may be potentially incorrect, may provide an effective warning to the sender of the electronic message as opposed to previous systems which automatically, and often, spuriously, warned the sender that a recipient may be incorrect without ever evaluating the recipients.

40 Claims, 3 Drawing Sheets

(56) References Cited

U.S. PATENT DOCUMENTS

| | | | |
|---|---|---|---|
| 7,472,163 B1* | 12/2008 | Ben-Yoseph et al. | 709/206 |
| 7,475,113 B2* | 1/2009 | Stolze | 709/206 |
| 7,499,976 B2* | 3/2009 | Cato | 709/207 |
| 7,516,182 B2* | 4/2009 | Goldman | 709/206 |
| 7,543,026 B2 | 6/2009 | Quine et al. | 709/206 |
| 7,596,600 B2* | 9/2009 | Quine et al. | 709/206 |
| 7,610,341 B2* | 10/2009 | Daniell | 709/206 |
| 7,673,342 B2* | 3/2010 | Hursey et al. | 726/24 |
| 7,836,134 B2 | 11/2010 | Pantalone | 709/206 |
| 2002/0010745 A1* | 1/2002 | Schneider | 709/206 |
| 2002/0087647 A1* | 7/2002 | Quine et al. | 709/206 |
| 2002/0141380 A1* | 10/2002 | Koguchi | 370/351 |
| 2003/0167311 A1* | 9/2003 | Kirsch | 709/206 |
| 2003/0195937 A1* | 10/2003 | Kircher et al. | 709/207 |
| 2003/0200334 A1* | 10/2003 | Grynberg | 709/245 |
| 2004/0181586 A1 | 9/2004 | Morreale et al. | |
| 2005/0080642 A1* | 4/2005 | Daniell | 705/1 |
| 2005/0080855 A1* | 4/2005 | Murray | 709/206 |
| 2005/0097174 A1* | 5/2005 | Daniell | 709/206 |
| 2005/0097177 A1* | 5/2005 | McUmber et al. | 709/206 |
| 2005/0188031 A1* | 8/2005 | Zandt | 709/206 |
| 2005/0254091 A1* | 11/2005 | Cranitch et al. | 358/1.18 |
| 2005/0278430 A1* | 12/2005 | Cato | 709/206 |
| 2006/0074932 A1* | 4/2006 | Fong et al. | 707/100 |
| 2006/0215823 A1* | 9/2006 | Gruchala et al. | 379/93.24 |
| 2007/0073818 A1* | 3/2007 | Gardner et al. | 709/206 |
| 2007/0073819 A1* | 3/2007 | Gardner et al. | 709/206 |
| 2008/0044057 A1* | 2/2008 | Keller et al. | 382/101 |

FOREIGN PATENT DOCUMENTS

| | | |
|---|---|---|
| JP | 9-8942 A | 1/1997 |
| JP | 2000-22739 A | 1/2000 |
| JP | 2000-301073 | 10/2000 |
| JP | 2002-24140 A | 1/2002 |
| JP | 2003-44402 A | 2/2003 |
| JP | 2004-302693 A | 10/2004 |
| JP | 2004-334505 A | 11/2004 |

OTHER PUBLICATIONS

*Method for Ambiguous Address Resolution of Potential Recipients*, IBM Technical Disclosure Bulletin, IBM Corp., New York, US, Vol. 35(7), Dec. 1, 1992, pp. 199-200.
Declaration of Christopher G. Wolfe.

* cited by examiner

RULE-BASED ELECTRONIC MESSAGE PROCESSING

PRIORITY

This application claims the benefit under 35 U.S.C. §119 (e) of U.S. Provisional Patent Application Ser. No. 60/721,224, entitled RULE-BASED E-MAIL COMMUNICATION PROCESSING, filed on Sep. 27, 2005, the entire disclosure of which is hereby expressly incorporated by reference herein.

FIELD OF THE INVENTION

The present invention generally relates to analyzing and processing electronic messages including, for example, e-mail communications.

BACKGROUND

If an e-mail is sent to an incorrect recipient, it can cause severe consequences to a firm including lost business and increased exposure to legal liability. Mistakes are typically severe because e-mail communications often cross firm boundaries.

Incorrect e-mail transmissions may occur for a number of reasons. For example, a high volume of e-mail communications may lead to shorter attention spans by personnel and less care being given to addressing e-mails. Further, e-mail applications, such as Microsoft Outlook™, for example, provide features that allow for instant "pinpoint" access to a cache of recently used addresses which "auto-complete" the e-mail address as it is being typed; however, these features may result in the auto-completion of an incorrect e-mail address. In addition, many firms have integrated customer relationship management (CRM) systems into their e-mail addressing systems. CRM systems typically have larger contact lists than individual e-mail contact lists, and thus, a greater frequency of mistakes may occur when a CRM system is used. Further, there may be an overlap of names between the external and internal addressing systems of a firm's e-mail system, and, when both addressing systems are accessible to a user, additional mistakes can occur. In addition, as the number of a firm's clients increases, the possibility of having similar or identical names such as "John Smith", for example, likewise increases.

In an attempt to reduce the frequency of the above-discussed mistakes, previous e-mail systems automatically reminded users that they should review the recipients of an e-mail before transmitting it. However, these automatic warnings were often spurious as most e-mails are actually correctly addressed. As a result, in many cases, users quickly became "trained" to click through and ignore these ineffective warnings when sending e-mails and thus became less attuned to the possibility of an incorrectly addressed e-mail. In view of the foregoing issues, what are needed are more effective systems and processes for processing e-mail communications.

SUMMARY

In various embodiments, a computer-assisted method for processing an electronic message includes the steps of reviewing the recipients of the electronic message, evaluating whether any of the recipients of the electronic message are potentially incorrect, and prompting the sender of the electronic message to evaluate whether the potentially incorrect recipients are correct. This computer-assisted method, as it evaluates whether a recipient may be potentially incorrect, may provide an effective warning to the sender of the electronic message as opposed to previous systems which automatically, and often, spuriously, warned the sender that a recipient may be incorrect without ever evaluating the recipients.

In various embodiments, a computer-readable medium for processing an electronic message comprises computer-executable instructions thereon for reviewing the recipients of the electronic message, evaluating whether any of the recipients of the electronic message are potentially incorrect, and prompting the sender of the electronic message to evaluate whether the potentially incorrect recipients are correct.

In various embodiments, a computer-assisted system for processing an electronic message comprises an e-mail communication management module for reviewing the recipients of the electronic message, evaluating whether any of the recipients of the electronic message are potentially incorrect, and prompting the sender of the electronic message to evaluate whether the potentially incorrect recipients are correct.

BRIEF DESCRIPTION OF THE FIGURES

The utility of the embodiments of the invention will be readily appreciated and understood from consideration of the following description of the embodiments of the invention when viewed in connection with the accompanying drawings, wherein.

Figure 1:
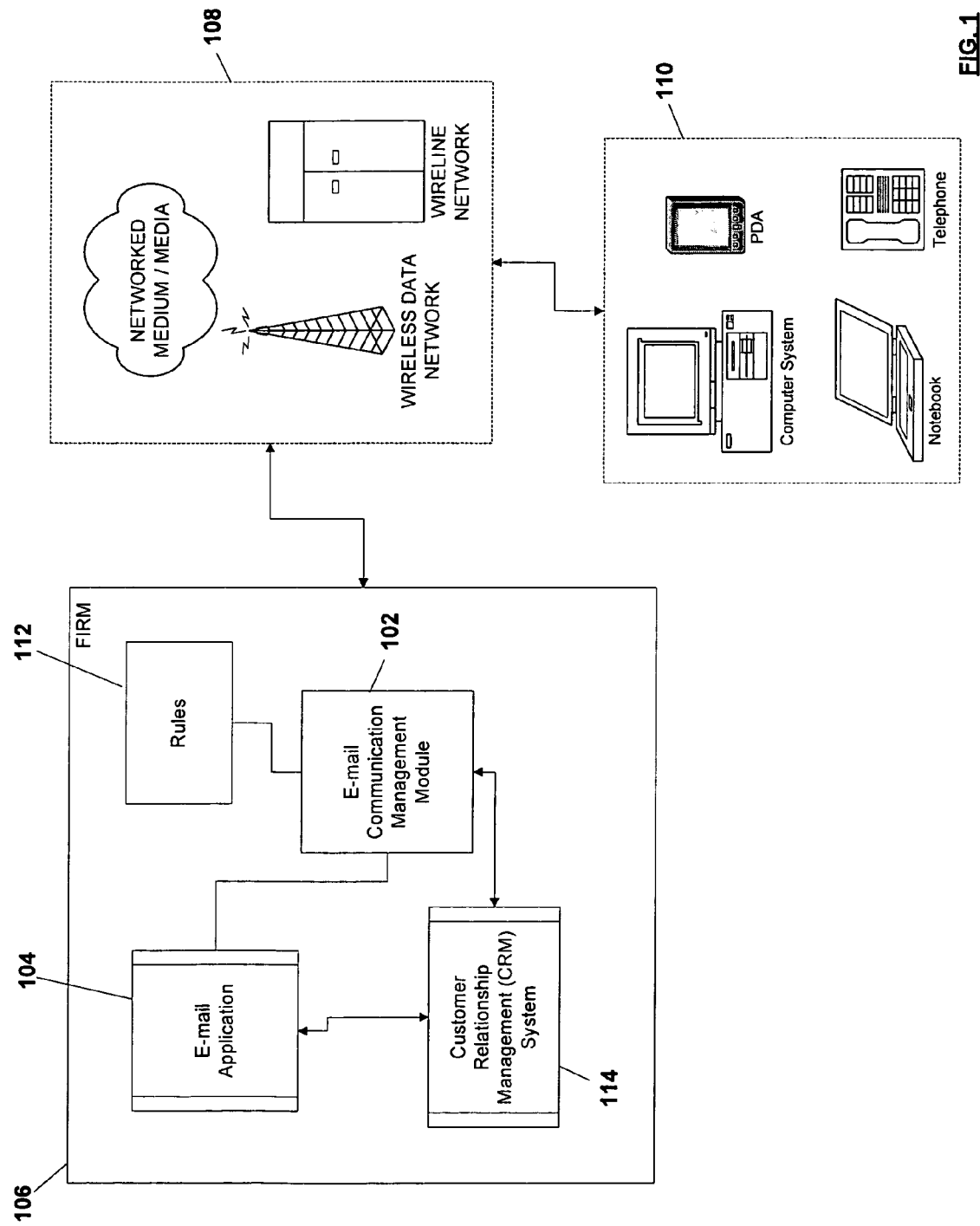
FIG. 1 includes an architecture diagram illustrating various system embodiments provided in association with the present invention.

Corresponding reference characters indicate corresponding parts throughout the several views. The exemplifications set out herein illustrate preferred embodiments of the invention, in various forms, and such exemplifications are not to be construed as limiting the scope of the invention in any manner.

DESCRIPTION

Figure 2:
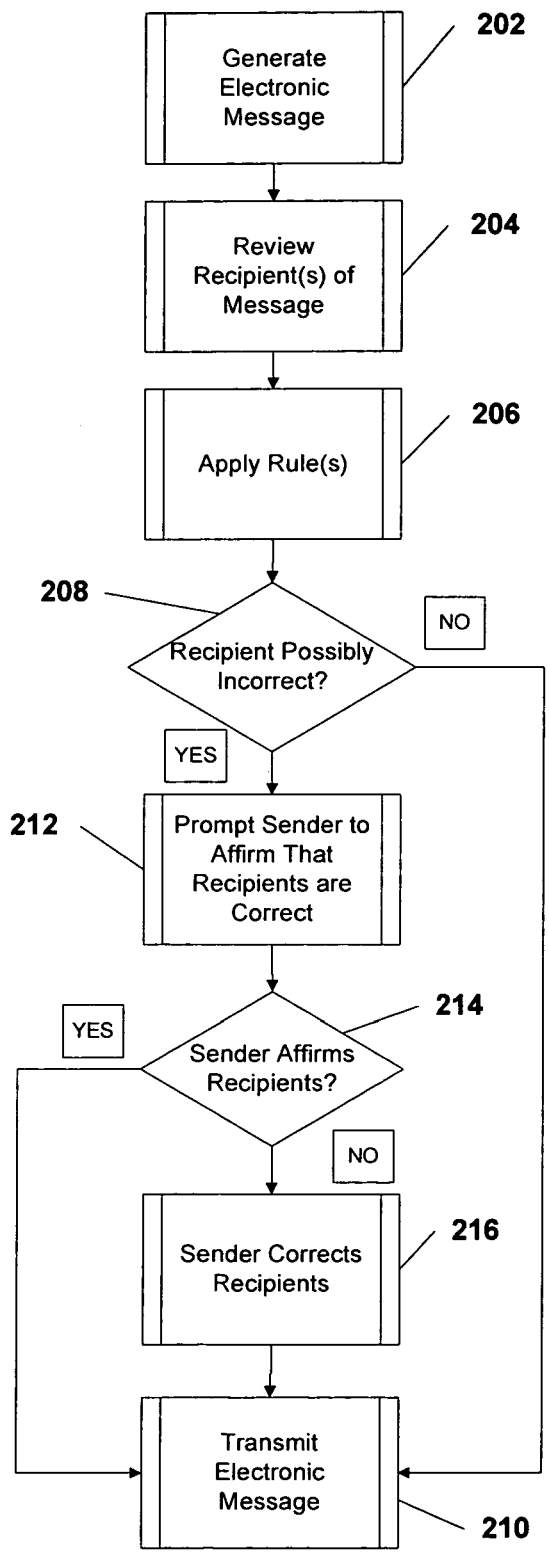
FIG. 2 includes a process flow diagram illustrating a method or process embodiment provided in association with the present invention.

Referring now to FIGS. 1 and 2, the present invention provides embodiments of an e-mail communication management module 102 that may reside within, or may be operatively associated with, a conventional e-mail application 104, such as Microsoft Outlook™, for example, of a firm 106 or institution. The e-mail application 104 may be configured to facilitate, transmit, and/or receive e-mail communications through a variety of communication media 108, such as, for example, wireless data networks, wireline networks, and/or networked media (such as Internet, intranet, or extranet), to and/or from various access devices 110 such as, for example, computer systems, personal digital assistants (PDAs), and wireless phones.

In operation, at step 202, the module 102 may be configured to detect events such as, for example, the sending of e-mail, and/or the transmission of electronic messages via instant-messaging windows and/or other electronic messaging software applications. When one or more of these events occur, at step 204, the module 102 may scan the electronic message generated by such electronic messaging software and review the recipients of the electronic message. At step 206, the module 102 may evaluate whether the recipients of the electronic message are potentially incorrect. To perform this evaluation, as discussed in further detail below, the module 102 may evaluate the recipients of the electronic message according to one or more predefined rules 112. To this end, in various embodiments, the module 102 may employ one or more rule modules that can be configured with a variety of heuristics to "guess" when an e-mail user has misaddressed an e-mail, for example, and may be configured to prompt the user, at step 212, to evaluate, and possibly correct, the recipient list. In the event that the module 102 determines that, in view of rules 112, the electronic message is properly addressed, the module 102 may permit the electronic message to be sent to the recipients.

The above-described module 102 is an improvement over previous e-mail modules. Previous e-mail modules do not evaluate whether the recipients of the electronic message may be incorrect before prompting the sender to confirm that the recipients are correct. Rather, these previous e-mail modules prompt the sender to confirm that the recipients are correct before transmitting every e-mail. As a result, users of these previous e-mail systems typically ignore these warnings as they do not assist the user in evaluating whether the recipients may be incorrect. The module 102 of the present invention is an improvement over these previous modules as the module 102 prompts the sender only when the module 102 has determined that the electronic message meets at least one of predefined rules 112. Accordingly, as the sender is warned only if one of rules 112 is met, the sender is more likely to evaluate the recipients of the electronic message after being prompted by the module. In various embodiments, to further facilitate the sender's review of the electronic message, the module 102 may prompt the sender in such a way that the sender has an opportunity to correct any mistakes in the recipient list without having to return to the e-mail composition window in the e-mail application 104.

After the sender has been prompted to evaluate the recipients of the electronic message at step 212, the sender, at step 214, may respond to the prompt by affirming that the recipients of the electronic message are correct. In this event, the module 102 may permit the electronic message to be sent to the recipients at step 210. However, in the event that the sender determines that one or more recipients are incorrect, the sender may correct the recipients at step 216. The module 102 may then allow the message to be sent to the recipients at step 210, or, in various embodiments, the module 102 may re-evaluate the recipients of the electronic message in the manner described above. The module 102 may re-evaluate all of the recipients or only the corrected recipients.

In various embodiments, the above-described actions of the sender can be recorded and reviewed by a supervisor and/or auditor, for example. In view of this potential supervisory review, it is believed that the senders of the electronic messages will diligently consider any warnings or prompts from the rule module. For example, in the event that an electronic message is misaddressed, the actions of the sender can be reviewed to determine whether the sender was warned about the misaddressed electronic message before it was sent.

The e-mail communication management module 102 may employ a rules engine configured to apply one or more of the rules 112. One rule may involve issuing a warning to a sender when the recipient, or recipients, of the message are not included in the sender's contact list stored in the e-mail application. Other rules may involve issuing a warning when a recipient of the electronic message is not included in the customer relationship management (CRM) system 114, where the CRM system 114 includes a database of contacts from more than one user. Another rule may involve issuing a warning when a recipient's name is identical to or substantially similar to at least two names in the sender's e-mail list and/or CRM system 114.

Another rule may involve issuing a warning when the e-mail domain name, i.e., the right-hand side portion of an e-mail address after the "@" sign, of the recipient, or recipients, does not match or substantially correspond to information associated with existing relationships in the firm's CRM system and/or existing e-mail contacts of the user stored in the e-mail application. Another rule may involve issuing a warning to a sender based on the ratio of internal to external recipients of the e-mail message, and/or a ratio of the occurrences of different e-mail domain names. When applying these rules, the module 102 may count the recipients having the same domain name as the sender and the recipients having a different domain name than the sender, and notify the sender when the ratio of these addresses exceeds a predetermined value, for example.

Another rule may involve issuing a warning when predefined key words or phrases in the e-mail body, subject, and/or attachments are found in the message. When applying this rule, the module 102 may scan the message for these words or phrases which, if found, indicate that the e-mail may not be appropriately addressed to recipients outside of firm 106, for example. Another rule may involve issuing a warning when predefined key words or phrases are found in e-mail attachment metadata. The metadata may identify, for example, the type of document being attached, an intended audience of the document, or a customer to whom the document pertains. When applying this rule, the characteristics of the e-mail recipient list, including, but not limited to, e-mail domain names, full e-mail addresses, ratio of internal to external addresses, prior contact history, and other characteristics, may be compared with the metadata to decide the likelihood of an addressing mistake. In addition, this rule may be associated with prompting the user for document metadata as part of the document creation process such as, e.g., within word processing or spreadsheet software applications, or other document creation applications, such that the supplied metadata can be used for comparison purposes as described above.

Figure 3:
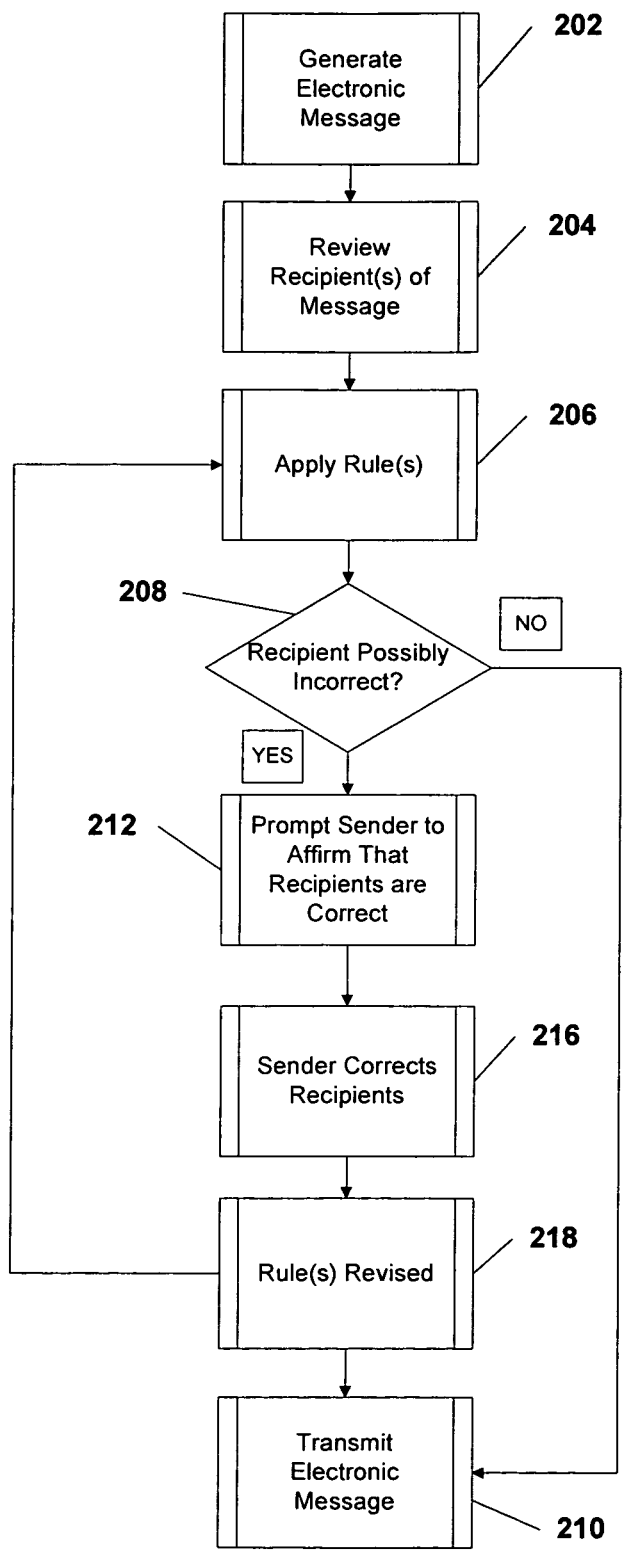
FIG. 3 includes a process flow diagram illustrating an alternative method or process embodiment provided in association with the present invention.

Referring to FIG. 3, in various embodiments, after a sender has instructed the module 102 that the recipients of the electronic message are correct, module 102 may use the sender's input to learn new rules, or exceptions to existing rules, that may reduce incorrect warnings when evaluating subsequent electronic messages. In various embodiments, the module 102 may also permit the sender to revise the rules 112. In these embodiments, the sender can "notify" module 102 about a new relationship or contact, for example, and "instruct" the module 102 to transmit future electronic messages without warning the sender that the new contact may be incorrect. Such instructions may involve adding an e-mail address to the user's set of known e-mail contacts or CRM system 114, for example. This learned information may then be used to define one or more rules 112 that can suppress the above-discussed warning prompt.

The benefits of the e-mail communication management modules described herein will be readily apparent to those skilled in the art. Embodiments of the invention provide a rich and diverse set of heuristics which can be integrated into a firm's CRM systems. The invention also provides e-mail communication management modules with the capability to learn to avoid unnecessary future warnings. Application of embodiments of the invention may also reduce the business and legal risks associated with e-mail communications.

The examples presented herein are intended to illustrate potential and specific implementations of the present invention. It can be appreciated that the examples are intended primarily for purposes of illustration of the invention for those skilled in the art. No particular aspect or aspects of the examples is/are intended to limit the scope of the present invention.

It is to be understood that the figures and descriptions of the present invention have been simplified to illustrate elements that are relevant for a clear understanding of the present invention, while eliminating, for purposes of clarity, other elements. For example, certain operating system details and modules of network platforms are not described herein. Those of ordinary skill in the art will recognize, however, that these and other elements may be desirable in a typical computer system or e-mail application, for example. However, because such elements are well known in the art and because they do not facilitate a better understanding of the present invention, a discussion of such elements is not provided herein.

Any element expressed herein as a means for performing a specified function is intended to encompass any way of performing that function including, for example, a combination of elements that perform that function. Furthermore the invention, as defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that at least some of the embodiments described herein may be implemented in many different embodiments of software, firmware, and/or hardware. The software code or specialized control hardware which may be used to implement embodiments of the invention is not limiting. For example, embodiments described herein may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. The operation and behavior of the invention embodiments may be described without specific reference to specific software code or specialized hardware components. The absence of such specific references is feasible, because it is clearly understood that artisans of ordinary skill would be able to design software and control hardware to implement the embodiments of the present invention based on the present description with no more than reasonable effort and without undue experimentation.

Moreover, the processes associated with the present embodiments may be executed by programmable equipment, such as computers or computer systems. Software that may cause programmable equipment to execute processes may be stored in any storage device, such as, for example, a computer system (non-volatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices and/or, for example, a carrier wave modulated, or otherwise manipulated, to convey instructions that may be read, demodulated/decoded, or executed by a computer or computer system.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary. A computer-readable medium may further include one or more data signals transmitted on one or more carrier waves.

A "computer" or "computer system" may be, for example and without limitation, a wireless or wireline variety of a microcomputer, minicomputer, server, mainframe, laptop, personal data assistant (PDA), wireless e-mail device (e.g., "BlackBerry" trade-designated devices), cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM), and/or other computer-readable media.

In various embodiments of the present invention disclosed herein, a single component may be replaced by multiple components, and multiple components may be replaced by a single component, to perform a given function or functions. Except where such substitution would not be operative, such substitution is within the scope of the invention. Any servers described herein, for example, may be replaced by a "server farm" or other grouping of networked servers that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

While various embodiments of the invention have been described herein, it should be apparent that various modifications, alterations and adaptations to those embodiments may occur to persons skilled in the art with attainment of at least some of the advantages of the present invention. The disclosed embodiments are therefore intended to include all such modifications, alterations and adaptations without departing from the scope and spirit of the present invention as set forth in the attached claims.

What is claimed is:

1. A computer-implemented method for processing a first e-mail, said e-mail having a sender and a plurality of recipients, said method comprising:
   prior to transmitting said e-mail to the plurality of recipients:
   reviewing, by a computer system, e-mail address information for the plurality of recipients of said e-mail, wherein said e-mail address information comprises a plurality of e-mail addresses;

determining, by said computer system, that said e-mail address information for the plurality of recipients of said e-mail is potentially incorrect, wherein the determining that said e-mail address information for the plurality of recipients of said e-mail is potentially incorrect comprises:
    calculating, by said computer system, a first number of e-mail addresses from the plurality of e-mail addresses having the same domain name as the sender;
    calculating, by said computer system, a second number of e-mail addresses from the plurality of e-mail addresses having a different domain name than the sender;
    determining, by said computer system, a ratio of internal to external recipients based on the first number and the second number; and
    determining, by said computer system, that said e-mail address information for at least one of the plurality of recipients is potentially incorrect based on the ratio of internal to external recipients of the e-mail message;
upon determining, by said computer system, that said e-mail address information for the at least one recipient is potentially incorrect, prompting said sender to evaluate whether said e-mail address information is correct; and
permitting, by said computer system, said e-mail to be transmitted to the at least one recipient upon receiving an indication from said sender that said e-mail address information for the at least one recipient is correct.

2. The computer-implemented method of claim 1, wherein an electronically stored contact list is associated with said sender, and wherein the determining that said e-mail address information for the plurality of recipients of said e-mail is potentially incorrect further comprises: determining, by said computer system, that said e-mail address information for at least one of the plurality of recipients is potentially incorrect if an e-mail address for the potentially incorrect at least one recipient that is not included in said contact list.

3. The computer-implemented method of claim 2, further comprising: adding, by said computer system, at least one of said potentially incorrect at least one recipient to said contact list after said indication is received from said sender that said potentially incorrect at least one recipient is correct.

4. The computer-implemented method of claim 3, further comprising:
    reviewing, by said computer system, e-mail address information for at least one recipient of a second e-mail, said second e-mail having a sender that is different from said sender of said first message;
    determining, by said computer system, that said at least one recipient of said second e-mail is potentially incorrect;
    prompting, by said computer system, said sender of said second electronic message to evaluate whether said potentially incorrect at least one recipient is correct; and
    adding, by said computer system, said potentially incorrect at least one recipient to said contact list after receiving an indication from said sender of said second electronic message that said potentially incorrect at least one recipient is correct.

5. The computer-implemented method of claim 1, wherein an electronically stored contact list is associated with said sender and wherein the determining that said e-mail address information for the plurality of recipients of said e-mail is potentially incorrect further comprises:
    determining, by said computer system, that the domain name of said at least one e-mail address is not included in said sender's contact list.

6. The computer-implemented method of claim 1, wherein the determining that said e-mail address information for the plurality of recipients of said e-mail is potentially incorrect further comprises: determining, by said computer system, that the ratio of internal to external recipients exceeds a predetermined value.

7. The computer-implemented method of claim 1, wherein an electronically stored contact list is associated with said sender, and wherein the determining that said e-mail address information for the plurality of recipients of said e-mail is potentially incorrect further comprises: determining, by said computer system, that the name of said at least one recipient is substantially similar to at least two names in said contact list.

8. A non-transitory computer-readable medium for processing a first e-mail, said e-mail having a sender and a plurality of recipients, said medium comprising computer-executable instructions thereon for:
    prior to transmitting said e-mail to the at least one recipient:
        reviewing e-mail address information for the plurality of recipients of said e-mail, wherein said e-mail address information comprises a plurality of e-mail addresses;
        determining that said e-mail address information for the plurality of recipients of said e-mail is potentially incorrect, wherein the determining that said e-mail address information for the plurality of recipients of said e-mail is incorrect comprises:
            calculating a first number of e-mail addresses from the plurality of e-mail addresses having the same domain name as the sender;
            calculating a second number of e-mail addresses from the plurality of e-mail addresses having a different domain name than the sender;
            determining a ratio of internal to external recipients based on the first number and the second number; and
            determining that said e-mail address information for at least one of the plurality of recipients is potentially incorrect based on a ratio of internal to external recipients of the e-mail message;
        upon determining that said e-mail address information for the at least one recipient is potentially incorrect, prompting said sender to evaluate whether said e-mail address information is correct; and
    permitting said e-mail to be transmitted to the at least one recipient upon receiving an indication from said sender that said e-mail address information for the at least one recipient is correct.

9. The non-transitory computer-readable medium of claim 8, wherein an electronically stored contact list is associated with said sender and wherein the determining that said e-mail address information for the plurality of recipients of said e-mail is potentially incorrect further comprises: determining that said at least one recipient is not included in said contact list.

10. The non-transitory computer-readable medium of claim 9, said medium further comprising computer-executable instructions thereon for adding said potentially incorrect at least one recipient to said contact list after indication is received from said sender that said potentially incorrect at least one recipient is correct.

11. The non-transitory computer-readable medium of claim 10, said medium further comprising computer-executable instructions thereon for:

reviewing e-mail address information for at least one recipient of a second e-mail, said second e-mail having a sender that is different from said sender of said first message;

determining that said at least one recipient of said second e-mail is potentially incorrect;

prompting said sender of said second electronic message to evaluate whether said potentially incorrect at least one recipient is correct; and adding said potentially incorrect at least one recipient to said contact list after receiving an indication from said sender of said second electronic message that said potentially incorrect at least one recipient is correct.

12. The non-transitory computer-readable medium of claim 8, wherein an electronically stored contact list is associated with said sender, and wherein the determining that said e-mail address information for the plurality of recipients of said e-mail is potentially incorrect further comprises: determining that the domain name of said at least one e-mail address is not included in said sender's contact list.

13. The non-transitory computer-readable medium of claim 8, further comprising computer-executable instructions for: determining that the ratio of internal to external recipients exceeds a predetermined value.

14. The non-transitory computer-readable medium of claim 8, wherein an electronically stored contact list is associated with said sender, and wherein the determining that said e-mail address information for the plurality of recipients of said e-mail is potentially incorrect further comprises: determining that the name of said at least one recipient is substantially similar to a name in said contact list.

15. A computer-implemented system for processing a first e-mail, said e-mail having a sender and plurality of recipients, said system comprising:

a computer system comprising a processor and operatively associated non-transitory memory, wherein the memory comprises instructions that, when executed by the processor, cause the computer system to:

prior to transmitting said e-mail to the at least one recipient:

review e-mail address information for the plurality of recipients of said e-mail, wherein said e-mail address information comprises at least one e-mail address;

determine that said e-mail address information for the plurality of recipients of said e-mail is potentially incorrect, wherein the determining that said e-mail address information for the plurality of recipients of said e-mail is potentially incorrect comprises:

calculating a first number of e-mail addresses from the plurality of e-mail addresses having the same domain name as the sender;

calculating a second number of e-mail addresses from the plurality of e-mail addresses having a different domain name than the sender;

determining a ratio of internal to external recipients based on the first number and the second number; and determining that said e-mail address information for at least one of the plurality of recipients is potentially incorrect based on a ratio of internal to external recipients of the e-mail message;

upon determining that said e-mail address information for the at least one recipient is potentially incorrect, prompting said sender to evaluate whether said e-mail address information is correct; and permit said e-mail to be transmitted to the at least one recipient upon receiving an indication from said sender that said e-mail address information for the at least one recipient is correct.

16. The computer-implemented system of claim 15, wherein an electronically stored contact list is associated with said sender, and wherein the determining that said e-mail address information for the plurality of recipients of said e-mail is potentially incorrect further comprises: determining that said at least one recipient is not included in said contact list.

17. The computer-implemented system of claim 16, wherein the memory further comprises instructions that, when executed by the processor, cause the computer system to add at least one of said potentially incorrect at least one recipient to said contact list after indication is received from said sender that said potentially incorrect at least one recipient is correct.

18. The computer-implemented system of claim 17, wherein the memory further comprises instructions that, when executed by the processor, cause the computer system to:

review e-mail address information for at least one recipient of a second e-mail, said second e-mail having a sender that is different from said sender of said first message;

determine that said at least one recipient of said second e-mail is potentially incorrect;

prompt said sender of said second electronic message to evaluate whether said potentially incorrect at least one recipient is correct; and add said potentially incorrect at least one recipient to said contact list after receiving an indication from said sender of said second electronic message that said potentially incorrect at least one recipient is correct.

19. The computer-implemented system of claim 15, wherein an electronically stored contact list is associated with said sender, and wherein the determining that said e-mail address information for the plurality of recipients of said e-mail is potentially incorrect further comprises: determining that the domain name of said at least one e-mail address is not included in said sender's contact list.

20. The computer-implemented system of claim 15, wherein the memory further comprises instructions that, when executed by the processor, cause the computer system to: determine that the ratio of internal to external recipients of said second number to said first number exceeds a predetermined value.

21. The computer-implemented system of claim 15, wherein an electronically stored contact list is associated with said sender, and wherein the determining that said e-mail address information for the plurality of recipients of said e-mail is potentially incorrect further comprises: determining that the name of a recipient is substantially similar to at least two names in said contact list.

22. The computer-implemented method of claim 1, further comprising: transmitting, by an e-mail application, said electronic message to the at least one recipient.

23. The computer-implemented method of claim 22, wherein an e-mail communication module resides in or is operatively associated with said email application.

24. The computer-implemented method of claim 1, comprising: displaying, by said computer system, a user interface to the sender to receive said indication from said sender that said e-mail address information for the at least one recipient is correct.

25. The computer-implemented method of claim 24, comprising:

receiving, by said computer system, data indicating corrected electronic address information for at least one of the plurality of recipients from said sender via said user interface; and permitting, by said computer system, said e-mail to be transmitted to the plurality of recipients upon receiving said data indicating corrected electronic address information from said sender.

26. The computer-implemented method of claim 25, further comprising sending the e-mail with corrected recipient list information without said sender returning to an e-mail composition window of an e-mail application.

27. The computer-implemented method of claim 1, wherein after the indication is received, from said sender that said potentially incorrect at least one recipient is correct, permitting e-mails addressed to said potentially incorrect at least one recipient to be transmitted without prompting said sender to evaluate whether said potentially incorrect at least one recipient is correct.

28. The computer-implemented method of claim 1, wherein an electronically stored contact list of a customer relationship management system is associated with said sender, and wherein the determining that said e-mail address information for the plurality of recipients of said e-mail is potentially incorrect further comprises: determining, by said computer system, that a domain name of said at least one e-mail address is not included in said contact list of said customer relationship management system.

29. The non-transitory computer-readable medium of claim 8, said medium further comprising computer-executable instructions thereon for: displaying a user interface to the sender to receive said indication from said sender via said user interface that said e-mail address information for the at least one recipient is correct.

30. The non-transitory computer-readable medium of claim 29, said medium further comprising computer-executable instructions thereon for:
receiving data indicating corrected e-mail address information for at least one of the plurality of recipients from said sender via said user interface; and
permitting said e-mail to be transmitted to the plurality of recipients upon receiving said data indicating corrected electronic address information from said sender via a user interface.

31. The non-transitory computer-readable medium of claim 30, said medium, further comprising computer-executable instructions for sending the e-mail with corrected recipient list information without said sender returning to an e-mail composition window of an e-mail application.

32. The non-transitory computer-readable medium of claim 8, said medium further comprising computer-executable instructions thereon for: after indication is received from said sender that said potentially incorrect at least one recipient is correct, permitting e-mails addressed to said potentially incorrect at least one recipient to be transmitted without prompting said sender to evaluate whether said potentially incorrect at least one recipient is correct.

33. The non-transitory computer-readable medium of claim 8, wherein an electronically stored contact list of a customer relationship management system is associated with said sender, and wherein the determining that said e-mail address information for the plurality of recipients is potentially incorrect further comprises: determining that a domain name of said at least one e-mail address is not included in said contact list of said customer relationship management system.

34. The computer-implemented system of claim 15, wherein the memory further comprises instructions that, when executed by the processor, cause the computer system to: display a user interface to the sender to receive said indication from said sender via said user interface that said e-mail address information for the at least one recipient is correct.

35. The computer-implemented system of claim 34, wherein the memory further comprises instructions that, when executed by the processor, cause the computer system to: receive data indicating corrected e-mail information for the at least one recipient from said sender via said user interface; and permit said e-mail to be transmitted to the plurality of recipients upon receiving said data indicating corrected electronic address information from said sender via a user interface.

36. The computer-implemented system of claim 35, wherein the memory further comprises instructions that, when executed by the processor, cause the computer system to send the e-mail with corrected recipient list information without said sender returning to an e-mail composition window of an e-mail application.

37. The computer-implemented system of claim 15, wherein the memory further comprises instructions that, when executed by the processor, cause the computer system to" after indication is received from said sender that said potentially incorrect at least one recipient is correct, permit e-mails addressed to said potentially incorrect at least one recipient to be transmitted without prompting said sender to evaluate whether said potentially incorrect at least one recipient is correct.

38. The computer-implemented system of claim 15, comprising an e-mail application executed by the computer system, wherein the an e-mail application is configured to transmit the electronic message to the at least one recipient.

39. The computer-implemented system of claim 15, wherein an electronically stored contact list of a customer relationship management system is associated with said sender, and wherein the determining that said e-mail address information for the plurality of recipients of said e-mail is potentially incorrect further comprises: determining that a domain name of said at least one e-mail address is not included in said contact list of said customer relationship management system.

40. The computer-implemented method of claim 1, wherein the determining that said e-mail address information for the plurality of recipients of said e-mail is potentially incorrect further comprises: determining that said e-mail address information for at least one of the plurality of recipients is potentially incorrect when a domain name associated with said at least one recipient is different from a domain name associated with said sender.

* * * * *